United States Patent Office 3,441,693
Patented Apr. 29, 1969

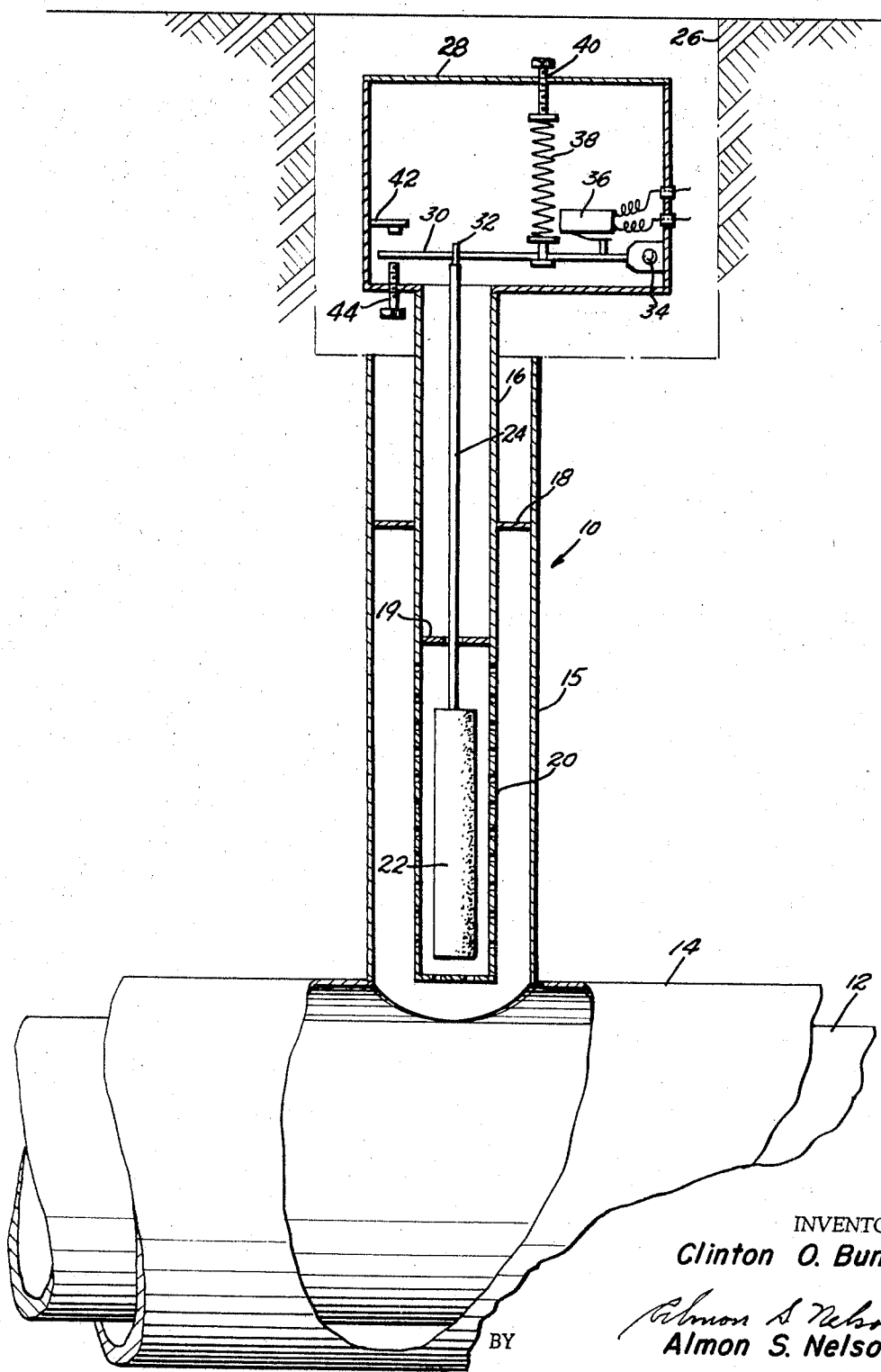

3,441,693
VAPOR DETECTING DEVICE
Clinton O. Bunn, 5210 Columbia Road,
Springfield, Va. 22151
Filed Oct. 3, 1966, Ser. No. 583,888
Int. Cl. H01h 29/00, 29/06
U.S. Cl. 200—61.04                      6 Claims

ABSTRACT OF THE DISCLOSURE

A vapor-sensing detector for detecting relatively elevated vapor pressures comprising a body of adsorptive material enclosed by housing means protecting such body from atmospheric conditions and simultaneously controlling the flow of vapor to such body. The body of adsorptive material is operatively connected to a switch through an adjustable lever, with a predetermined increase in weight of said body closing said switch to signal the elevated pressure condition.

THE DISCLOURE

The present invention generally relates to detecting devices especially useful in conjunction with conduit piping systems and more particularly relates to a vapor-sensing device to detect leaks from piping installed in a protective conduit.

The present invention also generally relates to vapor detecting devices especially useful in conjunction with the selective sensing of specific vapors which result from the combustion of fuels or chemical processes. More particularly, the invention relates to the high-limit control of a boiler firing operation by signaling the approach to the water vapor dew point. Another class of adsorbent or absorbent material would be used to signal a change in the carbon dioxide concentration of flue gas.

An object of this invention is to provide a vapor-sensing detector employing a vapor adsorbing or absorbing material to enable an alarm circuit to be activated, scavenging methods undertaken or some other remedial action to be taken when the ambient vapor concentration reaches or exceeds a predetermined level.

Another object of this invention is to provide a leak detector for use with an underground piping system with protective conduit in which the entire device is accessible from ground level for ease of installation and maintenance.

A further object of the present invention is to provide vapor-sensing device in accordance with the preceding objects which relies upon the well known rule that the weight of vapor adsorbed by a substance is proportional to the partial pressure of each gas or vapor which surrounds it. The weight adsorbed increases. Various adsorptive materials may be used depending on the vapor to be sensed inasmuch as certain materials are highly adsorptive with respect to a specific vapor. For example, the material selected to sense water vapor may be quite different from the material used to sense an increase in the concentration of a hazardous gas.

Still another object of the invention is to provide a vapor-sensing leak detector which is reliable over a long period of time under unfavorable conditions such as elevated pressures, variable temperature conditions and the like.

A still further object of this invention is to provide a vapor-sensing device disposed in a housing to maintain the mechanism in an enclosed condition in order to reduce the possibility of malfunction.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

The figure is a schematic sectional view of the vapor detector illustrating an exemplary installation.

Referring now specifically to the drawings, the numeral 10 generally designates the leak detector of the present invention which is associated with an underground pipe 12 having an enclosing protective conduit 14 in fluid tight relation. Extending upwardly from the conduit 14 is a vertical conduit or housing 15 connected thereto in any suitable manner such as welding.

Disposed concentrically within the housing 15 is a vertical tube 16 which is supported by a bracket 18 from housing 15 and the tube 16 includes an inwardly extending guide member 19 located in a perforated lower end portion 20.

A body 22 of adsorptive material is disposed interiorly of the perforated portion 20 of the tube 16 and is supported by rod 24 which extends up through the guide member 19 to the upper end of the tube 16. A ground level housing or hollow member 26 is connected to the upper end of housing 15 and receives a housing 28 fixed to the upper end of the tube 16 so that the leak detector is accessible from ground level for inspection and repair.

The upper end of the actuating rod 24 is pivotally attached to a lever 30 by pivot connection 32, and the lever 30 is pivotally connected to the housing 28 by a pivot bracket 34. A tilt switch 36 such as a mercury switch is mounted on the lever 30 for closing or opening a signal circuit when the lever 30 is tilted downwardly by the weight of the adsorptive body 22 and the related mechanism.

A calibrated tension coil spring 38 interconnects the lever 30 and an adjustment screw 40 in the top wall of housing 28. The free end of lever 30 extends under a stop 42 fixed to housing 28 and a stop screw 44 in housing 28 underlies the free end of the lever 30.

The perforated body or container 22 is filled with material which will selectively adsorb vapor which may leak into the annular space between pipe 12 and conduit 14. Upon adsorption of vapor due to an increase in the partial pressure of the vapor the increased weight of container 22 will fulcrum lever 30 downwardly about fulcrum point 34 by overcoming the tension in the balance spring 38 to tilt switch 36 for closing or opening a signal circuit.

The stop screw 44 limits downward swinging movement of the lever 30 thus preventing excessive elongation of spring 38 and also serves to lock lever 30 against stop 42 during shipment to prevent damage during shipment and handling. The housing 15, box or housing 26 and tube 16 all serve to protect the vapor detector thus assuring longevity of reliable and accurate operation even under adverse conditions such as extreme temperature variations, pressure variations and the like.

In order to avoid any confusion as to the use of the words "absorb" and "adsorb," it is to be understood that the term "adsorb" has been used generically for brevity throughout the specification and claims.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:
1. A vapor-sensing detector for detecting relatively ele- vated vapor pressures comprising a body of adsorptive material disposed in communicative relation with a source of vapor pressure, means surrounding said body and spaced therefrom for fully enclosing said body and protecting the same from atmospheric conditions while at the same time controlling the flow of vapor from said source to said body, signal circuit means, switch means forming part of said signal circuit means, lever means operatively interconnecting said body of adsorptive material and said switch means for actuating the latter, and adjustable balance means operatively connected to said lever for biasing the same to a predetermined position, whereby a predetermined increase in partial pressure of said vapor causes the weight of said body to increase thereby overcoming the bias of said balance means and actuating said switch thereby to signal the condition of an undesirably elevated vapor pressure.

2. The detector of claim 1, wherein said body is supported by a connecting rod operatively connected at its upper end to said lever.

3. The detector of claim 1 wherein said balance means comprises a spring secured to said lever, and adjusting means for varying the tension in said spring thereby varying the initial position of said lever.

4. The detector of claim 3 further including an adjustable stop member associated with said lever to prevent movement thereof that would overextend said balance means, and a lock member against which said lever can be locked when shipping, handling and installing said detector.

5. The detector of claim 1 wherein said protecting means includes a housing immediately surrounding said lever and said switch, and a tubular member connected to and extending downwardly from said housing, said tubular member being perforated in the region thereof surrounding said body thereby to permit vapor flow to said body.

6. The detector of claim 5 further including a second housing surrounding and spaced from said tubular member and secured at its lower end to a protective conduit in an underground piping system.

References Cited

UNITED STATES PATENTS

| | | | |
|---|---|---|---|
| 2,369,215 | 2/1945 | Crise | 200—61.07 |
| 2,432,367 | 12/1947 | Andersen | 200—61.04 |
| 2,856,476 | 10/1958 | Kaiser et al. | 200—61.04 |
| 3,333,072 | 7/1967 | Haggard | 200—61.04 |

ROBERT K. SCHAEFER, *Primary Examiner.*

H. O. JONES, *Assistant Examiner.*